United States Patent
Destephano et al.

(10) Patent No.: US 6,379,736 B1
(45) Date of Patent: Apr. 30, 2002

(54) GELATO COMPOSITION

(75) Inventors: Joseph Destephano, Burnsville; Kamel Chida, Edina; Ann Swartos, Bloomington; Kelly Davis-Kvam, Burnsville; Sumana Chakrabarti, St. Paul, all of MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/412,675

(22) Filed: Oct. 5, 1999

(51) Int. Cl.$^7$ ............................ A23G 9/00; A23G 9/02; A23G 9/04
(52) U.S. Cl. ................. 426/565; 426/586; 426/588
(58) Field of Search ...................... 426/565, 586, 426/588, 524

(56) References Cited

U.S. PATENT DOCUMENTS

| | | |
|---|---|---|
| 1,424,603 A | 8/1922 | Turney |
| 1,659,723 A | 2/1928 | Cosler |
| 3,128,193 A | 4/1964 | Hilker |
| 3,335,013 A | 8/1967 | Wolfmeyer |
| 3,345,185 A | 10/1967 | Pisani et al. |
| 3,510,316 A | 5/1970 | Decker |
| 3,769,027 A | 10/1973 | Mangiere et al. |
| 3,800,036 A | 3/1974 | Gabby et al. |
| 3,809,764 A | 5/1974 | Gabby et al. |
| 3,879,563 A | 4/1975 | Tucker et al. |
| 3,914,441 A | 10/1975 | Finney et al. |
| 3,917,875 A | 11/1975 | Gardiner |
| 3,928,649 A | 12/1975 | Cobb |
| 3,929,892 A | 12/1975 | Hynes et al. |
| 3,956,519 A | 5/1976 | Evans et al. |
| 3,962,465 A | 6/1976 | Richter et al. |
| 3,982,042 A | 9/1976 | Arden |
| 3,986,890 A | 10/1976 | Richter et al. |

(List continued on next page.)

FOREIGN PATENT DOCUMENTS

| | | |
|---|---|---|
| CH | 422 495 | 4/1967 |
| DE | 235 773 A3 | 5/1986 |
| EP | 0 147 483 A1 | 7/1985 |
| EP | 0 186 233 A2 | 7/1986 |
| EP | 0 308 091 A2 | 3/1989 |
| EP | 0 565 596 B1 | 3/1995 |
| EP | 0727148 * | 8/1996 |
| FR | 2559034 | 8/1985 |
| GB | 1273943 | 5/1972 |
| GB | 1444143 | 6/1976 |
| WO | WO 83/00005 | 1/1983 |
| WO | WO 85/01421 | 4/1985 |
| WO | WO 91/01091 | 2/1991 |
| WO | WO 92/11769 | 7/1992 |
| WO | WO 93/10703 | 6/1993 |

OTHER PUBLICATIONS

Rubash, "The Master Dictionary of Food and Wine", p. 157, 1996.*

Arbuckle, "Ice Cream", Third Edition, pp. 35, 38–40, 52, 53,59–61,81–85,96,246, 1977.*

Arbuckle, "Ice Cream", third edition, pp. 25, 28, 29, 35, 1977.*

(List continued on next page.)

Primary Examiner—Nina Bhat
(74) Attorney, Agent, or Firm—Merchant & Gould P.C.

(57) ABSTRACT

Dairy-based gelato is an Italian frozen dessert that has a smooth, soft, silky texture and that is generally more flavorful than ice cream. A gelato composition includes an amount of total solids, including at least one milk-solids source, at least one sugar source, and at least one fat source, to provide a frozen gelato that can be stored for up to one year and still retain a texture characteristic of freshly-made gelato. The amount of total solids may range between about 45 weight percent and about 60 weight percent. A gelato composition may also include a flavorant, such as, for example, chocolate, candy, coffee, nut, liqueur, or fruit flavor, and/or a gum/stabilizer, such as, for example, pectin.

51 Claims, 2 Drawing Sheets

Shear - Modulus Results

U.S. PATENT DOCUMENTS

| | | | |
|---|---|---|---|
| 3,995,070 | A | 11/1976 | Nagasawa et al. |
| 3,996,389 | A | 12/1976 | Osborne |
| 4,021,583 | A | 5/1977 | Arden |
| 4,110,476 | A | 8/1978 | Rhodes |
| 4,143,174 | A | 3/1979 | Shah et al. |
| 4,145,454 | A | 3/1979 | Dea et al. |
| 4,145,543 | A | 3/1979 | Wojtowicz et al. |
| 4,213,896 | A | 7/1980 | Davis |
| 4,219,581 | A | 8/1980 | Dea et al. |
| 4,260,636 | A | 4/1981 | Yasumatsu et al. |
| 4,282,262 | A | 8/1981 | Blake |
| 4,293,573 | A | 10/1981 | Bradley, Jr. et al. |
| 4,333,953 | A | 6/1982 | Trzecieski |
| 4,333,954 | A | 6/1982 | Trzecieski |
| 4,374,861 | A | 2/1983 | Trzecieski |
| 4,376,791 | A | 3/1983 | Holbrook et al. |
| 4,379,170 | A | 4/1983 | Hettinga et al. |
| 4,400,405 | A | 8/1983 | Morley et al. |
| 4,400,406 | A | 8/1983 | Morley et al. |
| 4,430,349 | A | 2/1984 | Malone et al. |
| 4,434,186 | A | 2/1984 | Desia et al. |
| 4,435,439 | A | 3/1984 | Morris |
| 4,462,932 | A | 7/1984 | Lonergan |
| 4,497,841 | A | 2/1985 | Wudel et al. |
| 4,510,166 | A | 4/1985 | Lenchin et al. |
| 4,542,035 | A | 9/1985 | Huang et al. |
| 4,552,773 | A | 11/1985 | Kahn et al. |
| 4,609,561 | A | 9/1986 | Wade et al. |
| 4,626,441 | A | 12/1986 | Wolkstein |
| 4,631,196 | A | 12/1986 | Zeller |
| 4,689,245 | A | 8/1987 | Kosikowski et al. |
| 4,707,997 | A | 11/1987 | Bigler et al. |
| 4,726,957 | A | 2/1988 | Lacourse et al. |
| 4,734,287 | A | 3/1988 | Singer et al. |
| 4,737,374 | A | 4/1988 | Huber et al. |
| 4,832,976 | A | 5/1989 | Griffin et al. |
| 4,837,035 | A | 6/1989 | Baker et al. |
| 4,837,036 | A | 6/1989 | Baker et al. |
| 4,840,813 | A | 6/1989 | Greenberg et al. |
| 4,853,246 | A | 8/1989 | Stevens |
| 4,855,156 | A | 8/1989 | Singer et al. |
| 4,874,627 | A | 10/1989 | Greig et al. |
| 5,051,271 | A | 9/1991 | Iyengar et al. |
| 5,110,614 | A | 5/1992 | Corbin et al. |
| 5,112,626 | A | 5/1992 | Huang et al. |
| 5,143,741 | A | 9/1992 | Podolski et al. |
| 5,175,013 | A | 12/1992 | Huang et al. |
| 5,605,712 | A | 2/1997 | Bertrand et al. |
| 5,789,004 | A | 8/1998 | Hogan et al. |
| 5,861,183 | A | 1/1999 | Feldpausch |

OTHER PUBLICATIONS

Chicago Tribune, "Ever–Changing Menu At Fresco's Keeps Interest Up", Sunday, Sep. 29, 1996, DialogClassicWeb printout, 2 pages, 1996.*

New orleans Times Picayune, "Europe Off–Season Avoid the Crowds, But Cope with the Cold", Sunday, Dec. 10, 1995, DialogClassicWeb printout, 3 pages, 1995.*

"Classic Desserts", Time–Life Books, p. 97, 1980.* http://www.epicurious.com, recipe for "Gelato Di Crema" by Faith Willinger, Aug. 1998.* http://www.epicurious.com, recipe for "Cappuccino Gelato", from Gourmet magazine, May 1992.* http.//www.epicurious.com, recipe for "Coffee Gelato", from Bon Appetit magazine, May 1997.* http://www.epicurious.com, recipe for "Pistachio Gelato", from Bon Appetit magazine, May 1997.* http://www.algelato.com, homepage, 2000.* http://www.Bene–Gelato.com, homepage, 2000.*

Arbuckle, W. S., *Ice Cream*, 2nd Ed., 8 pgs. (1972).

Arbuckle, W.S., *Ice Cream*, $3^{rd}$ ed., pp. 79, 96–106 (1977).

Arbuckle, W.S., "Stabilizers & Emulsifiers", *Ice Cream*, 4th Ed., Ch. 6, pp. 84–93 (1986).

"Avicel Cellulose Gel (Microcrystalline Cellulose) in Frozen Desserts," *FMC Bulletin C–52*, pp. 2–8 (Date unknown).

Berger, K.G. et al., "An Electron Microscopical Investigation of Fat Destabilzation in Ice Cream," J. Fd. Technol., vol. 6, No. 3, pp. 285–294 (Sep. 1971).

"Corn Syrups and Sugars", *Corn Industries Research Foundation*, 2d ed., pp. 61–5 (1958).

Eopechino, A.A. et al., "Use of High Maltose Corn Syrup in Ice Cream," *Ice Cream Review*, pp. 11–16 (Aug. 1967).

Fennema, O.R., ed., *Food Chemistry*, 2d ed., pp. 125–134 (1985).

"Go! Nutritional Information Sheet", *Phoenix Advanced Technology*.

Grant et al., *Grant & Hackh's Chemical Dictionary*, $5^{th}$ ed., pp. 258, 272 (1987).

Haenel, H. et al., The Use of Gel–Forming Maltodextrins (SHP) for Producing Reduced–Energy Food, Part 1), *Ernahrung Nutrition*, vol. 4, Part 7, pp. 1–14 (1980).

Hofi, M.A., "The Use of Ultrafilration in Ice Cream Making," *Egyptian J. Diary Sci.*, vol. 17, pp. 27–34 (1989).

Hoover, W.J. "Corn Sweetners With Full Spectrum of Functional Properties," *Food Processing's Catalog*, 4 pgs. (Reprinted from 1964–1965 Edition).

"How to Choose Food Starches, A Professional's Guide", *Chemical Corporation*, 9 pages (date unknow).

Jacobson, *Eater's Digest*, pp. 247, 249 (1972).

Kloser, J.J. et al., "A Study of Some Variables That Effect Fat Stability and Dryness in Ice Cream,"*Ice Cream Review*, vol. 42, No. 10, 8 pgs. (May 1959).

Levine, H. et al., "Principles of "Cryostabilization" Technology from Structure/Property relationships of Carbohydrate/Water System—A Review," *Cryo–Letters*, vol. 9, pp. 21–62, (1988).

Mahdi, S.R. et al., "Fat Destabilization in Frozen Desserts Containing Low Dextrose Equivalent Corn Sweeteners," *Journal of Dairy Science*, vol. 52, No. 11,pp. 1738–1741 (Date unknown).

Mahdi, S.R. et al., "Ice Cream and Ice Milk," *Dairy and Ice Cream Field*, 4 pgs. (Oct. 1970).

"Maltrin® Maltodextrins and Corn Syrup Solids", Grain Processing Corporation, pp. 1–20 (date unknown).

Olson, R.L., "Effects of Various Sweeteners on the Quality of Frozen Desserts," *Master Thesis—University of Wisconson*, i–vi, 1–241 (1966).

Party, Jr. R.M., "Milk Coagulation and Protein Denaturation," *Fundamentals of Dairy Chemistry*, Second Ed., Ch. 11, pp. 603–661 (1974).

Pihl, M.A. et al., "Characteristics of Frozen Desserts Sweetened With Fructuose and Lactose,"*Journal of Food Science*, vol. 47. No. 3, pp. 989–991 (May–Jun. 1982).

"Purina Proteins Non–Dairy Frozen Desserts" Brochure, 3 pgs. (Date unknown).

Search Results (10 Pages).

"Specialty Starches in the Dairy Industry," *National Starch and Chemical Company, Food Products Div.*, 10 pgs. (Date unknown).

Tziboula, A. et al., "Effect of Starches on the Heat Stability of Milk," *International Journal of Food Service and Technolgy*, vol. 28, pp. 13–24 (1993).

Tziboula, A. et al., "Milk Protein–Carbohydrate Interactions," *International Dairy Journal*, vol. 3, pp. 209–223 (1993).

Webb et al., *Fundamentals of Dairy Chemistry*, pp. 786–810 (1965).

Marshall, R. et al., "Stabilizers and Emulsifiers", *Ice Cream*, Fifth Edition, Chapters 6 and 12, pp. 71–80, 140–11 and 232 (1996).

Willinger, F., "GELATO: The Inside Scoop on Italian Frozen Desserts", *Gourmet*, pp. 94, 96, and 97 (Jul. 1999).

* cited by examiner

GELATO COMPOSITION

FIELD OF THE INVENTION

The invention is generally directed to a dairy-based gelato that has desirable textural characteristics even after being stored frozen for more than a few hours and up to about 1 year. More specifically, the invention is a gelato that has a smooth, soft texture, is silky, and delivers characteristics comparable to traditional gelatos that are served within two or three hours of formulation.

BACKGROUND OF THE INVENTION

Frozen desserts, such as, for example, ice cream, ice milk, milk shakes, frozen yogurt, sorbet, sherbet, granita, gelato, etc., are popular consumer items. These types of frozen desserts can be purchased fresh from specialty shops, such as ice-cream parlors, gelateria, and the like. Some of these frozen desserts, for example, ice cream, can readily be stored and shipped to grocery stores for purchase and still maintain a commercially acceptable body, flavor, and texture. But this is not the case for Gelato.

Most gelato is sold by to-go portions in small cups or cones because gelato does not travel well and is at its best when eaten within hours of production. Gelato is a generic name for Italian frozen desserts, which encompasses dairy-based frozen desserts as well as water-based frozen desserts depending on the region of Italy in which the term is used. Italy has three main schools for making gelato, each characterized by varying degrees of richness and each determined by the climate and availability of ingredients.

The Sicilian school for making gelato, which is the oldest, excels in fruit and nut flavors. On the western side of the island, water-based granita is granular, finely broken-up ice crystals. In the east, the same mixture is churned to a silkier state. Even the dairy-based gelato tends to be leaner in Sicily because it is often made without egg yolks and thickened with either cornstarch or wheat starch.

The Tuscan school for making gelato typically relies on using unsold milk. This results in a leaner gelato than those made with cream. But this gelato is still as silky as its richer counterparts.

The Veneto school for making gelato typically combines milk and cream in dairy bases to which fruit flavorings can be added. The Veneto school is believed to have the richest, most elegant gelato. (See Gourmet, pp. 94 to 97 (July 1999) for a general description of the three gelato-making schools).

Dairy-based gelato is smoother, softer, more flavorful, and less overwhelmed by cream than traditional ice cream. And traditional ice cream is colder, harder, airier, and higher in butterfat than gelato. Dairy-based gelato has a silkiness that sets it apart from traditional ice cream.

Dairy-based gelato is typically characterized as having low storage stability. That is, when gelato is stored for periods of time greater than a few hours, the gelato loses its characteristic smooth, soft, silky texture. Similarly, dairy-based gelato is typically characterized as being relatively intolerant to elevated temperatures. This means that gelato must be eaten relatively quickly after removal from a freezer and cannot be readily refrozen. Because gelato has low storage stability and low tolerance to temperature fluctuations, producing gelato that has the traditional characteristics of freshly-made gelato but is stable enough to be shipped and stored for later sale is a challenge.

A need still remains for a dairy-based gelato that can be stored for more than a few hours and still retain its silkiness, smoothness, and softness.

SUMMARY OF THE INVENTION

The invention is generally directed to a dairy-based gelato that has desirable textural characteristics even after being stored frozen up to about 1 year. Desirable textural characteristics include those typically associated with freshly-made gelato. Freshly-made gelato is smoother, softer, and more flavorful than traditional ice cream. Gelato is also generally described as being silky.

A gelato of the invention is substantially free of graininess or grittiness and provides a smooth mouth feel. A gelato of the invention also has a soft texture that can be characterized as between a soft-serve frozen dessert and frozen ice cream served immediately from a consumer's freezer. A gelato of the invention is also more flavorful than other frozen desserts, particularly ice cream.

According to one aspect of the invention, a gelato composition includes at least one milk-solids source; at least one sugar source; and at least one fat source. This gelato composition includes total solids in an amount sufficient to provide a frozen gelato that can be stored for up to about one year and still retain a texture characteristic of freshly-made gelato.

In another aspect of the invention, a gelato composition includes at least one nonfat-milk-solids source; at least one sugar source; and at least one fat source. This gelato composition includes total milk solids in an amount of between about 6 weight percent and about 12 weight percent; total sugar in an amount of between about 18 weight percent and about 37 weight percent; total fat in an amount of between about 4 weight percent and about 12 weight percent; and total solids in an amount of between about 45 weight percent and about 60 weight percent. The amount of total solids is sufficient to provide a frozen gelato that can be stored for up to about one year and still retain a texture characteristic of freshly-made gelato.

In yet another aspect of the invention, a gelato composition includes condensed skim milk in a range of between about 16 weight percent and about 30 weight percent; sucrose in a range of between about 16 weight percent and about 22 weight percent; heavy cream in a range of between about 11 weight percent and about 14 weight percent; starch hydrolysate having a DE value of between about 18 and 26, preferably between about 18 and 22, more preferably about 20 and in an amount between about 9 weight percent and about 18 weight percent; egg yolk in a range of between about 3 weight percent and about 7 weight percent; and balance of water. This gelato composition includes total solids in an amount of between about 45 weight percent and 60 weight percent, and the amount of total solids included is sufficient to provide a frozen gelato that can be stored for up to about one year and still retain a texture characteristic of freshly-made gelato.

A gelato composition of the invention can also have added flavorants.

DETAILED DESCRIPTION OF THE INVENTION

Figure 1:
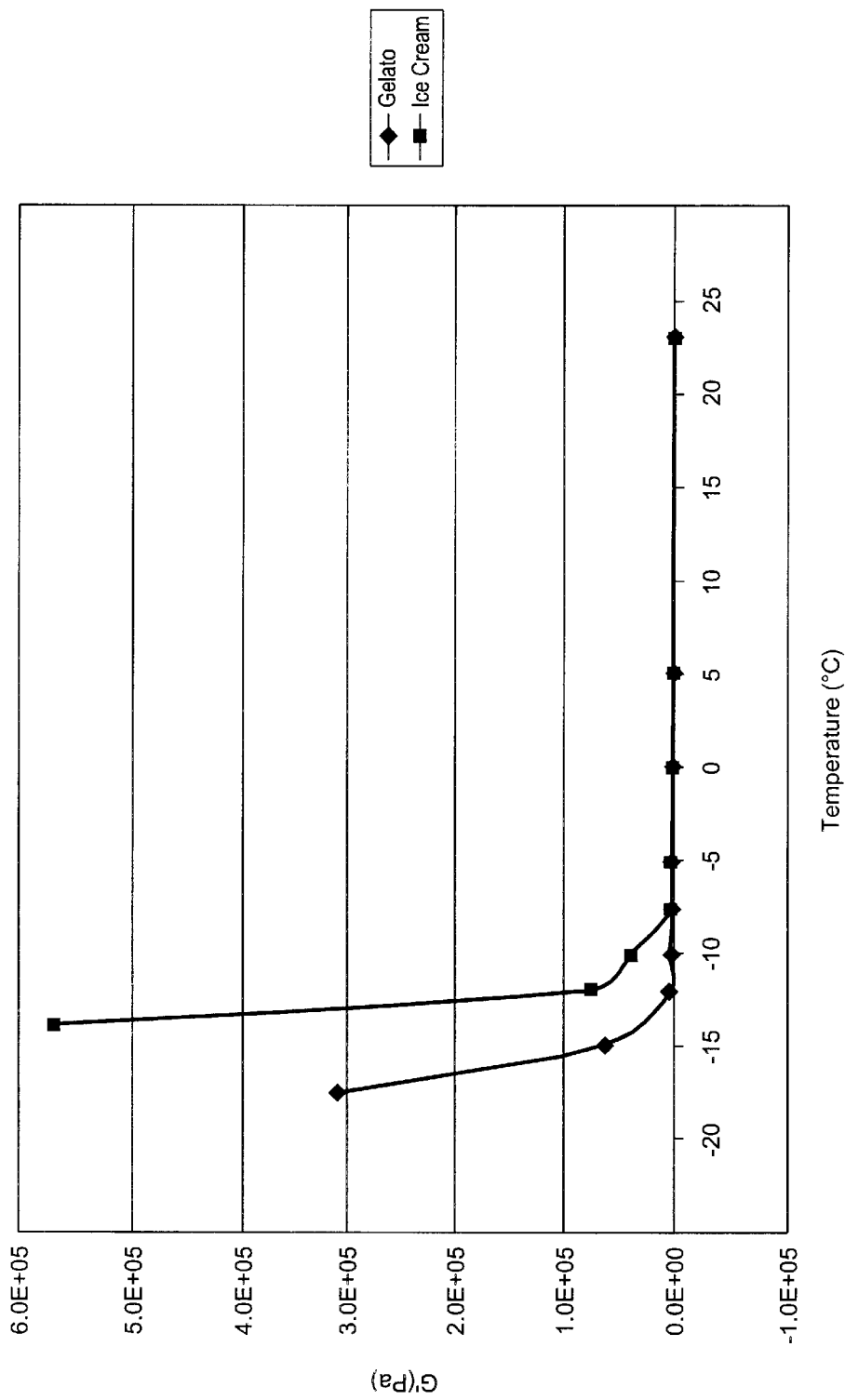
FIG. 1 shows shear-modulus data generated from a parallel-plate fixture.

The invention is directed to a dairy-based gelato that has desirable textural characteristics even after being stored frozen for extended periods. Preferably a gelato of the invention has desirable textural characteristics for an amount of time sufficient to ship the prepared gelato to grocery stores and to store the prepared gelato for a reasonable amount of time at the grocery store, for example, 6 months.

Desirable textural characteristics include those typically associated with freshly-made gelato-i.e., gelato that is consumed within 2 to 3 hours after being prepared. For example, freshly-made gelato is smoother, softer, and more flavorful than traditional ice cream. Gelato also tends to melt faster than traditional ice cream. Often times, gelato is described as being silky. That is, gelato has a characteristic sheen that is visually apparent as well as an extremely smooth, but nongreasy, mouth feel when consumed.

A gelato of the invention is substantially free of graininess or grittiness and provides a smooth mouth feel. A gelato of the invention also has a soft texture that can be characterized as between a soft-serve frozen dessert and frozen ice cream that is served immediately from a consumer's freezer, which tends to have a hard texture.

A gelato of the invention is also more flavorful than other frozen desserts, particularly ice cream. Traditional ice creams, which have about 38 weight-percent to about 42 weight-percent fat, are less flavorful when consumed because the fat inhibits flavor release. A gelato of the invention is more flavorful because it has less fat than traditional ice cream to inhibit flavor release. For example, if a consumer were to eat a spoonful of traditional chocolate ice cream, followed by a spoonful of a chocolate-flavored gelato of the invention, and then a second spoonful of traditional chocolate ice cream, the second spoonful of traditional chocolate ice cream would be perceived to have little if any chocolate flavor and a great amount of rich cream and fat.

The smooth, soft texture of a gelato of the invention as well as the high flavor characteristic of a gelato of the invention provides attributes that are desired by consumers. Other attributes of a gelato of the invention that add to this consumer acceptability is its freezer stability. The gelato of the invention can withstand extended frozen storage and temperature fluctuations during frozen storage without extensive formation of large ice crystals that can be detrimental to the product.

A gelato of the invention includes a higher amount of solids than traditional ice cream and comparable total fat, preferably less fat, than traditional ice cream. The term "solids" includes but is not limited to any component that is able to bind water in a gelato of the invention. For example, the term "solids" includes nonfat-milk solids, sugar, starch hydrolysates, egg solids, fat, solids from flavorings, etc. The term "total fat" includes the sum of fat contributed by any component in a gelato of the invention, such as, for example, fat contributed from egg yolks, milk products, flavorants, oils, etc.

Traditional ice cream has at least 20% total milk solids (including milkfat and nonfat-milk solids) and at least 10% milkfat. If the ice cream has more than 10% milkfat, the amount of nonfat-milk solids can be adjusted accordingly to provide the minimum amount of total milk solids. Traditional ice cream typically includes about 36 weight-percent to about 42 weight-percent total solids.

Because a gelato of the invention has a higher amount of solids than traditional ice cream, its texture is smoother and softer than traditional ice cream. Although this invention is not limited to any single theory, it is believed that the higher amount of solids binds up sufficient water to reduce the number and/or size of ice crystals that can form and that the respective amounts of total solids and total fat provides the desirable smooth, soft, silky texture.

Because a gelato of the invention has no more total fat, and preferably less fat, than traditional ice cream, a gelato of the invention can melt faster than traditional ice cream and is more flavorful than traditional ice cream.

A gelato of the invention typically includes total solids in an amount that is sufficient to provide a gelato that can be stored frozen at temperatures in a range between about −10° F. and about −20° F. for up to one year and retain a texture characteristic of freshly-made gelato. The amount of total solids should be sufficient to provide the desirable texture. The amount of total solids should not exceed an amount that would result in a mixture that is so viscous that it cannot be processed or has an undesirable texture. A gelato of the invention typically has between about 45 weight-percent and about 60 weight-percent total solids, preferably between about 48 weight-percent and about 55 weight-percent total solids, and more preferably between about 49 weight-percent and about 51 weight-percent total solids.

The solids included in a gelato of the invention include at least one milk-solids source, at least one sugar source, and at least one fat source. A milk-solids source is provided to contribute to the stability of the gelato. A milk-solids source is a source of high-molecular-weight compounds that provide body and texture to a gelato of the invention, decrease sensitivity to temperature fluctuations, and increase stability of a frozen product. The term "milk-solids" includes any nonfat-milk solid, such as, for example, milk protein, lactose, minerals, nonfat dry milk, casein, and whey, and also includes milkfat.

A milk-solids source includes any source suitable for binding a sufficient amount of water to facilitate achieving a smooth, soft texture in a final frozen gelato. Examples of a suitable milk-solids source include condensed skim milk, heavy cream, nonfat dry milk, half and half, whole milk, buttermilk, dried milk proteins, soy milk, soy protein, milk replacers, lactose-reduced skim milk, milk from other sources such as from goat, sheep, etc., or a combination thereof. One milk-solids source is condensed skim milk that is about 32 weight-percent milk solids.

A gelato of the invention should include a milk-solids source in an amount effective to achieve a smooth, soft texture in a final frozen product. Yet a gelato of the invention should not include a milk-solids source in an amount that would cause undesirable hardness or texture in the final frozen product. A gelato of the invention may include milk solids in an amount between about 8 and 24 weight percent, preferably between about 10 and 20 weight percent, and more preferably between about 12 and 16 weight percent. Preferably a gelato of the invention includes a milk-solids source in an amount that provides nonfat-milk solids in a range of between about 6 weight percent and about 12 weight percent, preferably between about 7 weight percent and about 11 weight percent, more preferably between about 8 weight percent and about 10 weight percent. Some fat sources, such as, for example, heavy cream, may be unable to provide the desired amounts of milk solids without being added in combination with a more concentrated source of milk protein, such as, for example, condensed skim milk, dried milk proteins, nonfat dry milk, casein, whey, etc.

A sugar source in a gelato of the invention is provided to add sweetness to the gelato and to contribute to the stability of the gelato by providing solids. A sugar source includes any source suitable for achieving the sweetness desired in a final frozen product and for contributing to the desired amount of solids for binding water.

Examples of a suitable sugar source include starch hydrolysates including corn-syrup solids, partially hydrolyzed wheat starch, partially hydrolyzed rice starch, etc., liquid amber sugar, sucrose, fructose, dextrose, other mono- and disaccharides, or a combination thereof. A gelato of the invention should include a sugar source in an amount sufficient to contribute to the desired amount of solids for desirable texture and to achieve a desirable amount of sweetness. But the amount of sugar source should not exceed an amount that would cause off flavors and result in a frozen product having a rubbery or gummy texture. A gelato of the invention can include total sugar in an amount between about 18 weight percent and about 37 weight percent, preferably between about 22 weight percent and about 35 weight percent, and more preferably in an amount between about 27 and 33 weight percent.

Preferably the sugar source is a mixture of sucrose and starch hydrolysate. Starch hydrolysates suitable for use in a gelato of the invention should have a DE (dextrose equivalent) value of between about 18 and about 26, preferably between about 18 and 22, more preferably about 20.

Starch hydrolysates provide solids and therefore stability to the product. The amount of starch hydrolysates should be sufficient to provide stability but should not exceed an amount that would result in high off flavors or unacceptable texture. Preferably a gelato of the invention includes an amount of starch hydrolysate in a range of between about 2 weight percent and 20 weight percent, preferably between about 6 and 19 weight percent, and more preferably between about 10 and 18 weight percent.

Sucrose provides sweetness to a gelato of the invention. The amount of sucrose should be effective to provide a desirable amount of sweetness and soft texture, but should not exceed an amount that would result in a gelato composition that is too sweet or unstable. Preferably a gelato of the invention includes an amount of sucrose in a range of between about 10 weight percent and about 22 weight percent, preferably between about 12 weight percent and about 19 weight percent.

A fat source is provided in a gelato of the invention to provide desirable mouth feel. A suitable fat source includes any source that can provide desirable mouth feel without substantially inhibiting flavor release and without substantially inhibiting the desirable soft and smooth texture of a frozen product. Examples of suitable fat sources include heavy cream, half and half, butterfat, whole milk, egg yolks, oils, fats contributed by flavorants, or a mixture thereof. Preferably the fat source is provided by heavy cream and egg yolks. Egg yolks may help emulsify the components and include about 20 weight-percent to about 24 weight-percent fat, typically about 22 weight-percent fat. Depending on the fat source chosen, the fat source may also contribute to the amount of nonfat-milk solids, amount of sugar, amount of flavoring solids, or a mixture thereof. For example, if the fat source is heavy cream, heavy cream is between about 5 weight-percent and about 6 weight-percent milk solids.

A gelato of the invention should include a fat source in an amount effective to provide desirable mouth feel. But the amount of fat source should not exceed an amount that substantially inhibits the ability of a gelato of the invention to deliver high flavor or that provides a greasy mouth feel. A gelato of the invention includes a fat source that provides fat in a range of between about 4 weight percent and about 12 weight percent, preferably between about 5 weight per- cent and 11 weight percent, more preferably between about 6 weight percent and about 8 weight percent.

A fat source of the invention should provide a desirable amount of milk fat. A gelato of the invention should include milk fat in a range between about 2 weight percent and 12 weight percent, preferably between about 3 weight percent and about 9 weight percent, and more preferably between about 4 weight percent and 6 weight percent. Fat sources that can provide the desirable milk fat include, for example, half and half, heavy cream, milk, or a mixture thereof.

A gelato of the invention also includes a balance of water.

A gelato of the invention may optionally include a gum/stabilizer to provide for improved transport stability. That is, a gelato of the invention can be transported by a consumer between, for example, a grocery store and home and not appear too watery or liquid upon opening the container at home. A suitable gum/stabilizer includes guar, cornstarch, pectin, locust bean, or a mixture thereof. A gum/stabilizer can be provided in an amount effective to provide transport stability. But the amount should not be so high as to create a melt defect or high amounts of gelling. A gelato of the invention can include a gum/stabilizer in an amount of up to about 0.2 weight percent, preferably in an amount of between about 0.75 and 0.2 weight percent. Preferably a low-gelling agent, such as, for example, pectin, is used over a high or moderate gelling agent.

A gelato of the invention can also include flavorants, such as, for example, vanilla, chocolate, coffee, fruit, nut, liqueur, vegetable, tea, candy, etc. These flavorants can be provided in the form of, for example, powder, puree, paste, syrup, concentrate, alcohol, liquid, solid, etc. Depending on the type and/or form of flavorant added, the amount of solids may need to be adjusted according to the ranges provided in the specification. For example, for a high-solids flavorant, such as, for example, paste, powder, concentrate, etc., the amount of sugar added to the gelato may need to be reduced in accordance with the amount of solids added by the flavorant such as by, for example, a 1:1 replacement of flavorant solids for sugar. As another example, for a low-solids flavorant, such as, for example, syrup, puree, etc., the amount of water added to a gelato of the invention may need to be reduced to achieve the desired level of solids in the gelato product.

Table 1 illustrates the useful, preferred, and more preferred ranges of the total nonfat-milk solids, total milk solids, total sugar, total milk fat, total fat, and total solids included in a gelato of the invention.

TABLE 1

Weight Percent of Ingredients Included in a Gelato of the Invention

| Ingredient | Weight Percent | | |
|---|---|---|---|
| | Useful | Preferred | More Preferred |
| Total Nonfat-Milk Solids | about 6 to 12 | about 7 to 11 | about 8 to 10 |
| Total Milk Solids | about 8 to 24 | about 10 to 20 | about 12 to 16 |
| Total Sugar | about 18 to 37 | about 22 to 35 | about 27 to 33 |
| Total Milk Fat | about 2 to 12 | about 3 to 9 | about 4 to 6 |
| Total Fat | about 4 to 12 | about 5 to 11 | about 6 to 8 |
| Total Solids | about 45 to 60 | about 48 to 55 | about 49 to 51 |

In some embodiments, a gelato according to the invention includes a mixture of condensed skim milk and heavy cream to provide milk solids. In some embodiments, a gelato according to the invention includes a mixture of sucrose and starch hydrolysate to provide the sugar component. In some embodiments, a gelato according to the invention includes a mixture of heavy cream and egg yolk to provide fat.

In one embodiment, a gelato according to the invention includes condensed skim milk in a range of between about 16 weight percent and about 30 weight percent; heavy cream in a range of between about 11 weight percent and about 14 weight percent; sucrose in a range of between about 10 weight percent and about 22 weight percent; starch hydrolysate having a DE value between about 18 and 26 and in an amount of between about 9 weight percent and about 18 weight percent; egg yolk in a range of between about 3 weight percent and about 7 weight percent; and a balance of water. In this embodiment, the gelato includes about 45 weight-percent to about 60 weight-percent total solids, preferably between about 48 weight-percent and 55 weight-percent total solids, and more preferably between about 49 weight-percent and 51 weight-percent total solids.

A gelato of the invention can alternatively include condensed skim milk in a range o f bet ween about 25 weight percent and 28 weight percent; heavy cream in a range of between about 12 weight percent and about 13 weight percent; sucrose in a range of between about 12 weight percent and about 19 weight percent; starch hydrolysate in a range of between about 10 weight percent and about 18 weight percent; or egg yolk in a range of about 4 weight percent and 6 weight percent.

In another embodiment, a gelato of the invention further includes a gum, such as, for example, pectin. A gelato of the invention can also include a flavorant.

A frozen gelato of the invention can be stored for up to one year and still retain a texture characteristic of freshly-made gelato.

Preparation

To prepare a gelato of the invention, a base mixture including, for example, at least one nonfat-milk-solids source, at least one fat source, at least one sugar source, and water are blended, heated to about 100° F. in a plate heat exchanger, homogenized and then pasteurized in a plate heat exchanger . The mixture is then cooled to between about 38° F. and about 42° F., preferably to about 40° F. Any flavorant that typically needs to be dissolved in a liquid, such as, for example, dry powder flavorings or any flavorings that need pasteurization should also be included in the initial base, which is blended, homogenized, pasteurized, and cooled. Other flavorants can be added prior to or after pasteurization and homogenization.

This liquid base mixture can be processed into a semifrozen solid by cooling the liquid mixture in a freezer to between about 20° F. and about 25° F., preferably between about 20° F. and about 22° F. While cooling the liquid base mixture, air is dispersed at between about 15 and 100 psi through the mixture by agitation and/or shear to create an overrun of up to about 60% and preferably between about 10 and 40%. This mixture is then quickly hardened by passing through a hardening tunnel and cooling the mixture to between about −10° F. and −35° F. Preferably the mixture is hardened as soon as possible to facilitate the stability of the gelato. The stability of the gelato is improved if smaller ice crystals form. Preferably the temperature of the semifrozen product does not increase more than about 5° F. above its temperature upon exiting the freezer when it enters the hardening tunnel. More preferably the temperature of the semifrozen product does not increase more than about 3° F. above its temperature upon exiting the freezer when it enters the hardening tunnel.

During the processing of a gelato of the invention, the base mixture should be introduced into the blending-and-pasteurization system at the lowest viscosity possible and mixed slowly to facilitate the efficient processing of a gelato of the invention.

This invention will be further characterized by the following examples. These examples are not meant to limit the scope of the invention, which has been fully set forth in the foregoing description. Variations within the scope of the invention will be apparent to those skilled in the art.

EXAMPLES

The following examples depict a nonlimiting illustration of the various attributes of the invention when prepared and compared to other frozen systems.

Working Example 1

Exemplary Flavored Gelato According to the Invention

To prepare a gelato of the invention, a base mixture including condensed skim milk, water, sucrose, heavy cream, corn-syrup solids (about 20 DE), egg yolk, and pectin were blended and pasteurized. For chocolate-flavored gelato, cocoa and vanilla extract were also blended with the base mixture.

The blended mixture was homogenized and pasteurized in a conventional two-stage homogenizer and cooled to between about 32° F. and about 40° F. Other flavorants that do not require hydration or pasteurization can be added prior to or after homogenization and pasteurization.

The liquid mixture was then transformed into a semifrozen solid by cooling the liquid mixture to between about 20° F. and about 25° F. The semifrozen solid was then hardened by freezing to at least −10° F. The semifrozen solid was hardened as rapidly as possible. The hardened product was then stored at a temperature of between about −10° F. and about −20° F.

The ingredients for a chocolate gelato are shown in Tables 2. The overrun for the gelato was about 30%.

TABLE 2

Chocolate-Flavored Gelato

| Ingredient | Weight Percent |
|---|---|
| Skim Milk, Condensed, Fresh U.S. Grade A | 26.67 |
| Ingredient Water | 21.47 |
| Sucrose | 18.88 |
| Heavy Cream (40% Butterfat) | 12.50 |
| 20 DE Corn Syrup Solids[1] | 10.63 |
| Egg Yolk | 4.50 |
| Cocoa (20–22% Fat) | 5.00 |
| Vanilla Extract | 0.20 |
| Pectin (High Methoxy)[2] | 0.15 |
| TOTAL | 100.00 |

[1]20 DE Corn Syrup Solids from Grain Processing Corporation (Muscatine, IA)
[2]High Methoxy Pectin from Danisco Ingredients (St. Joseph, MO)

Working Example 2

Stability of Flavored Gelatos According to the Invention

To obtain and maintain the silky, smooth, and soft texture of a gelato of the invention, the structure of the gelato must be characterized by desirable stability. One diagnostic suitable for determining the stability of a gelato of the invention includes evaluating the ice crystals found in a frozen product. All frozen desserts have at least some ice crystals. It would be undesirable to completely eliminate all ice crystals because the ice crystals deliver the cold sensation to a consumer's tongue when a frozen dessert is consumed. Yet a frozen dessert that contains too many ice crystals or ice crystals that are too large, for example, greater than about 80 microns, have undesirable textural changes. Preferably the ice crystals are sized between about 20 and 50 microns when stored at 10° F. for two weeks.

To determine ice-crystal size, a sample of a frozen gelato was analyzed under a microscope. This procedure may only be used to determine the size of ice crystals that are no greater than about 100 microns.

A gelato sample was taken from one inch down in the center of a pint of gelato of the invention. A thin layer of the gelato sample (approximately 1 mm in diameter) was dispersed in mineral oil, which was cooled to at least −20° C., on a glass slide. A cover slip that was cooled to at least −20° C. was applied over the sample. An eraser of a pencil that was cooled to at least −20° C. was used to press down the cover slip and spread the ice cream very thinly throughout the mineral oil. When pressing down the cover slip, care was taken not to apply so much pressure that the ice crystals in the sample cracked.

The glass slide was inserted into a thermal microscope stage and tank unit (Physitemp Model TS-4 adapted for ice crystals, Physitemp Instruments Inc., Clifton, N.J.), and a stream of nitrogen was applied over the stage. The thermal microscope stage was equipped with an immersion cooler (Lauda Model IC-6, Lauda-Konigshofen, Germany), and the sample was maintained at no more than −20° C.

The sample was viewed through a light microscope configured with a 10× objective. If the ice crystals appeared to be mostly overlapped, then the slide was quickly removed and the cover slip was moved around to further disperse the sample in the mineral oil. When the ice crystals in the sample were not substantially overlapping, a photomicrograph was taken by a Zeiss Microscope Camera, Model MC63A (Carl Zeiss, Inc., New York). The photomicrograph image was processed in a Cambridge Instruments Quantimet 570 image processing and analysis system (Cambridge Instruments, Inc., Illinois), and the image was quantified using the Quantimet 570 program, which calculated the mean-equivalent diameter data of the ice crystals. Preferably photomicrograph data were obtained when at least 50 particles were pictured. Only crystals that were not overlapping or were not touching an edge of the picture were counted in the 50-particle number. Duplicate samples were prepared and analyzed.

Calibration of the digitizing equipment was confirmed by digitizing a photograph using a micrometer or standard particles.

To illustrate the stability of a gelato of the invention, a stability test was conducted on a chocolate-flavored gelato having 30% overrun as described in Example 1. The gelato was stored at 10° F., and the size of ice crystals found in the chocolate-flavored gelato was measured weekly and compared to a low-fat chocolate ice cream (including skim milk, corn syrup, sugar, corn-syrup solids, cocoa with alkali, cream, egg yolk, vanilla, pectin, and vitamin A palmitate; Häagen-Dazs, Edina, Minn.) and a full-fat ice cream (including cream, sugar, skim milk, egg yolk, and cocoa with alkali; Häagen-Dazs, Edina, Minn.).

TABLE 3

Ice-Crystal Size in Chocolate-Flavored Gelato and Known Ice-Cream Products

| | Ice-Crystal Size (micron) | | |
|---|---|---|---|
| WEEK # | Chocolate-Flavored Gelato | Low-Fat Chocolate Ice Cream | Full-Fat Chocolate Ice Cream |
| 0 | 28 | — | — |
| 2 | 35 | — | — |
| 3 | 34 | 49 | 48 |
| 4 | 34 | — | — |
| 5 | 38 | 56 | 50 |

The stability data show that a chocolate-flavored gelato of the invention had smaller ice crystals than the control low-fat and fall-fat chocolate ice creams. Preferably a gelato of the invention has ice crystals that are at least 20% smaller than, more preferably at least 24% smaller than, the corresponding full-fat or reduced-fat ice cream. "Corresponding" refers to a similarly flavored full-fat or reduced-fat ice cream.

Working Example 3

Rheometry of a Gelato According to the Invention

Rheological data were collected to measure the stability of a gelato of the invention during storage. To determine the firmness of a frozen product, the shear modulus and shear yield stress were determined. A firmer product has a larger shear modulus (i.e., G' value) and/or larger shear yield stress. To determine the thickness of a melted product, shear viscosity was determined for a melted product. A thicker melted product has a higher shear viscosity.

A chocolate-flavored gelato of the invention prepared as described in Example 1 was compared with the full-fat chocolate ice cream described in Example 1 (Häagen-Dazs, Edina, Minn.). All samples were stored at −18° C. prior to testing. For yield-stress measurements, samples were tempered to the test temperature prior to testing. All experiments were carried out using the chocolate-flavored product.

Shear Modulus

To determine shear modulus (G') for each sample, small-amplitude oscillatory-shear experiments were conducted using a Rheometrics Dynamic Stress Rheometer, SR-500 (Rheometric Scientific, Piscataway, N.J.). The rheometer was equipped with a Peltier system to control temperature during the testing. Tests were carried out over a temperature range of −18° C. to 23° C.

Experiments were carried out using a parallel-plate assembly. The top plate fixture was made of plastic and the bottom plate was part of the Peltier heating system. The parallel-plate fixture had a diameter of about 40 mm and a gap of 2".

The rheometer was set at 0° C., and the frost was wiped off the plates before test sample was loaded. Testing was started as soon as the gap was set, and excess fluid was removed from the fixture edges. The temperature of the test fixture was immediately brought down to test temperature, which ranged between −18° C. and 23° C. A fresh sample was loaded for each test temperature. Temperature can be changed exceptionally quickly using the Peltier system for temperature control. The rapid temperature change helped prevent melting of test samples before reaching the cold test temperatures. The time to reach the test temperature was about 2–3 minutes for temperatures below 0° C. After reaching the test temperature, the samples were equilibrated at that temperature for 30 seconds prior to taking the measurements.

The rheometer conducted dynamic strain-sweep experiments at a frequency of 1 rad/sec., spanning a range of 0.4% to 100% in strain and −18° C. to 23° C. in temperature. The G' values reported were taken from the linear temperature range and low strain. The shear modulus (G') values that were measured were generally invariant with respect to strain. The ice cream at temperatures lower than −15° C. was too stiff to be measured in the SR-500 rheometer.

FIG. 1 shows the shear-modulus data generated from the parallel-plate fixture. FIG. 1 shows shear modulus, G' (Pa), versus test temperature (° C.). FIG. 1 shows a gelato of the invention having about an 88% lower shear modulus than the known ice cream at temperatures of less than about −15° C. Thus, a gelato of the invention is softer than the known ice cream at these temperatures. Preferably a gelato of the invention has a shear modulus that is at least about 25%, preferably at least about 50%, and more preferably at least about 75% less than the corresponding ice cream.

Shear Yield Stress

To determine yield stress, the stress growth profile for a sample was determined and evaluated. The stress growth profile involves measuring the maximum stress value of a sample when the sample is deformed at a fixed rate of rotation over a period of time.

A portable Haake VT550 rheometer (Haake, Paramus, N.J.) with a 3 Ncm transducer head was used to measure the yield stress of test samples. Because this instrument does not provide any temperature-control system for test samples, the following procedure was adapted for test samples at cold temperatures.

The samples were tempered at −18, −12, −9, −6 or 15° C. for 48 hours prior to determining the stress growth profile for each sample by keeping the samples in insulated boxes, which were kept in freezers held at the respective specific test temperatures.

The stress growth profile of each sample was measured with a four-bladed vane. The height of the vane was 6 mm and diameter of the vane was 16 mm. To test molten samples at 15° C., a larger size vane, 20 mm×20 mm, was used to generate measurable stress on the instrument.

The vane was cooled in ice water to at least 0° C. prior to conducting the experiments, and the vane was then attached to the VT550 rheometer. The blade was rotated at a fixed rate of 0.48 rpm and the yield-stress values were determined.

The insulated box containing the sample was brought out at room temperature. The vane was inserted in the sample, which was kept in its original container in the insulated box. A temperature thermocouple was inserted into the sample to measure the sample temperature during testing.

Figure 2:
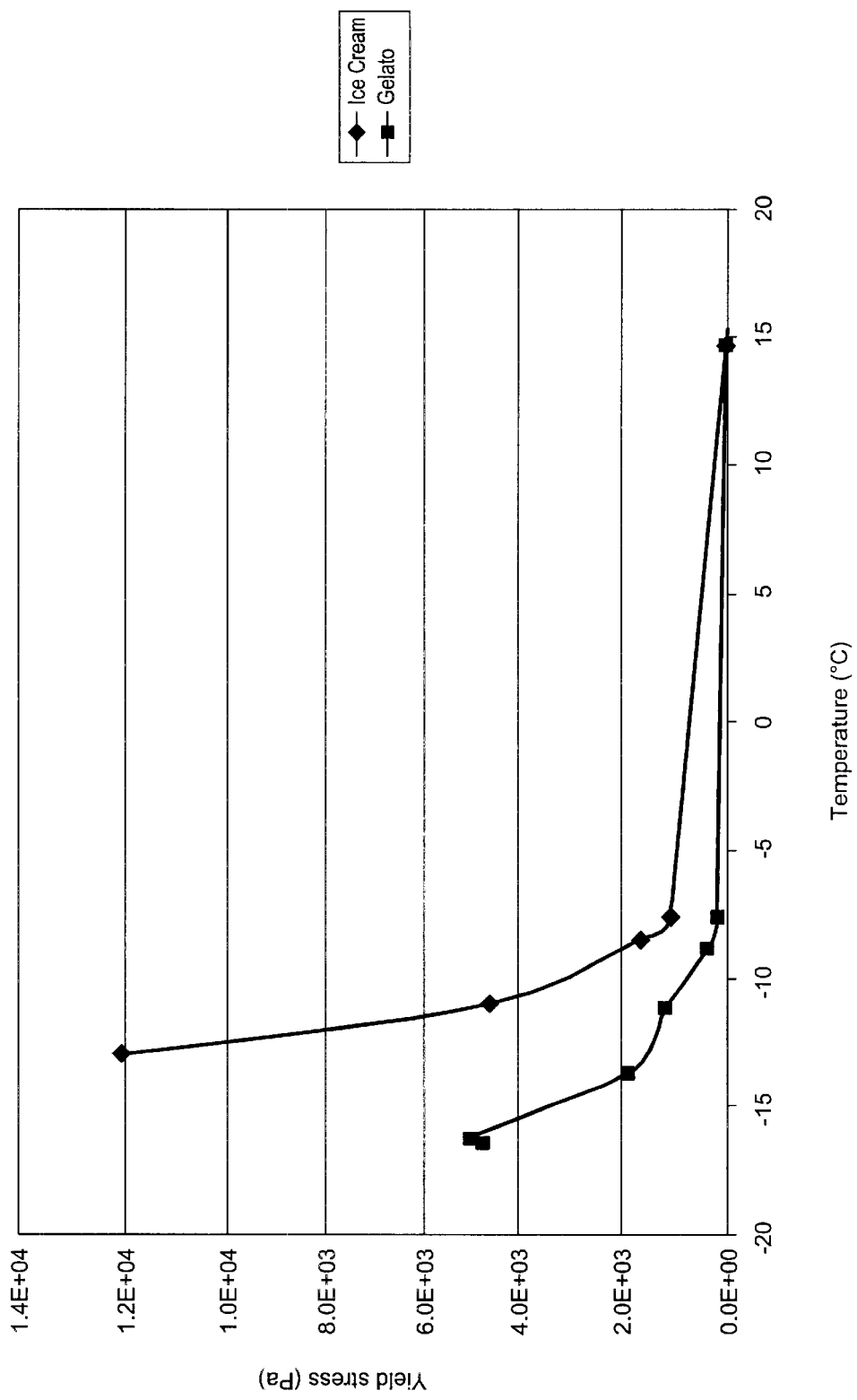
FIG. 2 shows a stress growth profile of a gelato of the invention compared to a known ice cream.

The yield stress results are shown in FIG. 2. FIG. 2 shows a gelato of the invention having about an 83% lower shear yield stress than the known ice cream at temperatures of less than about −15° C. Thus, a gelato of the invention is softer than the known ice cream at these temperatures. Preferably a gelato of the invention has a shear yield stress that is at least about 25%, preferably at least about 50%, and more preferably at least about 75% less than the corresponding ice cream.

Fluid Viscosities

A sample of the chocolate-flavored gelato of the invention and sample of full-fat chocolate ice cream (Häagen-Dazs, Edina, Minn.) were left at room temperature to melt. The melted samples were loaded into ARES-LS rheometer (Rheometric Scientific, Piscataway, N.J.) with a 200 gm transducer, and the samples were equilibrated to about 40° C. using a heated water jacket and maintained at about 40° C. prior to testing.

A steady-state sweep test method was used to measure the viscosity of each sample as a function of shear rate. To measure the viscosity, a cup-and-bob assembly was used. The cup diameter was about 34.0 mm, the bob diameter was about 32.0", and the bob length was about 33.56".

Table 4 shows the results of the viscosity test.

TABLE 4

Viscosities of Melted Chocolate-Flavored Gelato and Chocolate Ice Cream

| Sample | Viscosity (Poise at $10s^{-1}$) |
| --- | --- |
| Chocolate-Flavored Gelato | 5.09 |
| Chocolate Ice Cream | 1.13 |

Table 4 shows that melted chocolate-flavored gelato is nearly 5 times more viscous than the known chocolate ice cream. It was surprising to observe that although the gelato had a softer texture than ice cream under frozen conditions, as shown for the shear modulus and shear yield stress, it had a higher viscosity than ice cream upon melting. While not intending to be bound by theory, it is believed that this higher viscosity of the melted gelato helps to deliver high flavor to the gelato when consumed.

A viscosity of melted gelato at a temperature of about 20° C. should have a viscosity of between about 2 and 8 poise at $10s^{-1}$, preferably between about 3 and 7 poise at $10s^{-1}$, more preferably between about 4 and 6 poise at $10s^{-1}$.

Working Example 4

Stability of Flavored Gelatos and the Effect of Added Gum/Stabilizer

To determine whether a gum/stabilizer would affect the stability of a gelato according to the invention, a gelato without a gum/stabilizer was compared to a gelato with a gum/stabilizer. A first set of chocolate-flavored gelatos having an overrun of about 20% were prepared, and a second set of chocolate-flavored gelatos having an overrun of about 45% were prepared. Aside from the amount of overrun incorporated, the first and second sets were duplicates.

A chocolate-flavored gelato without any gum was prepared. The gelato was prepared according to Example 1 except no pectin was included and the appropriate overrun was incorporated.

A chocolate-flavored gelato including cornstarch was prepared. The gelato was prepared according to Example 1 except cornstarch (1 weight percent) replaced pectin and the appropriate overrun was incorporated.

A chocolate-flavored gelato including guar was prepared. The gelato was prepared according to Example 1 except guar (0.04 weight percent) replaced pectin and the appropriate overrun was incorporated.

A chocolate-flavored gelato including a mixture of guar and cornstarch was prepared. The gelato was prepared according to Example 1 except guar (0.04 weight percent) and cornstarch (1.0 weight percent) replaced pectin and the appropriate overrun was incorporated.

A chocolate-flavored gelato including pectin was prepared as described in Example 1 except the appropriate overrun was incorporated.

A chocolate-flavored gelato including a mixture of pectin and cornstarch was prepared. The gelato was prepared according to Example 1 except a mixture of pectin (0.2 weight percent) and cornstarch (1.0 weight percent) replaced pectin and the appropriate overrun was incorporated.

Tables 5 and 6 show the results of the stability study.

TABLE 5

Effect of Gum/Stabilizer on Ice-Crystal Size in a Gelato (overrun 20%)

Ice-Crystal Size (micron)

| Week | No Gum | Cornstarch | Guar | Guar/Cornstarch | Pectin | Pectin/Cornstarch |
|------|--------|------------|------|-----------------|--------|-------------------|
| 0 | 23 | 25 | 36 | 28 | 28 | 25 |
| 3 | 37 | 36 | 37 | 37 | 40 | 45 |
| 5 | 39 | 43 | 40 | 41 | 47 | 43 |

TABLE 6

Effect of Gum/Stabilizer on Ice-Crystal Size in a Gelato (overrun 45%)

Ice-Crystal Size (micron)

| Week | No Gum | Cornstarch | Guar | Guar/Cornstarch | Pectin | Pectin/Cornstarch |
|------|--------|------------|------|-----------------|--------|-------------------|
| 0 | 23 | 25 | 36 | 28 | 28 | 25 |
| 3 | 40 | 36 | 38 | 37 | 40 | 42 |
| 5 | 40 | 38 | 40 | 40 | 41 | 41 |

It appears that stability as measured by ice-crystal size is substantially the same for all gelato samples regardless of whether a gum is incorporated because of the high solids level of the gelato product.

The above specification, examples, and data provide a complete description of the manufacture and use of the composition of the invention. Since many embodiments of the invention can be made without departing from the spirit and scope of the invention, the invention resides in the claims hereinafter appended.

The claimed invention is:

1. A gelato composition comprising:
   a) an amount of milk solids effective to provide a smooth, soft texture to the composition;
   b) an amount of sugar effective to provide sweetness and solids to the composition, wherein the sugar comprises sucrose and a starch hydrolysate having a dextrose equivalent value of between about 18 and about 26;
   c) an amount of fat effective to provide a smooth, non-greasy mouth feel; and
   d) total solids in an amount of between about 45 weight percent and about 60 weight percent based on the weight of the gelato composition, wherein the total solids are effective to provide a gelato that can be stored frozen up to one year and still retain a texture of freshly made gelato.

2. The composition of claim 1, wherein the composition can be stored for up to about 1 year at temperatures in a range between about −10° F. and about −20° F. and have ice crystals sized between about 30 and 80 microns.

3. The composition of claim 1, further comprising a gum/stabilizer.

4. The composition of claim 1, wherein milk solids are provided by condensed skim milk, heavy cream, half and half, whole milk, buttermilk, dried milk proteins, soy milk, soy protein, milk replacers, or a combination thereof.

5. The composition of claim 1, wherein the composition includes an amount of nonfat-milk solids between about 6 weight percent and 12 weight percent.

6. The composition of claim 1, wherein the amount of sugar is between about 18 weight percent and 37 weight percent and the amount of starch hydrolysate is between about 2 and about 20 weight percent.

7. The composition of claim 1, wherein fat is provided by heavy cream, half and half, butterfat, egg yolks, flavoring ingredient, or a combination thereof.

8. The composition of claim 1, wherein the amount of fat is between about 4 weight percent and 12 weight percent.

9. The composition of claim 1, wherein the composition has a yield-stress value of less than traditional ice cream at −15° C.

10. The composition of claim 1, wherein the composition has a shear-modulus value of less than traditional ice cream at −15° C.

11. The gelato composition of claim 1, wherein a melted gelato composition has a viscosity greater than a traditional ice cream at about 20° C.

12. The composition of claim 1, wherein the composition can be stored up to two weeks at 10° F. with ice crystals sized between about 20 and 50 microns.

13. A gelato composition comprising:
   a. nonfat-milk solids in an amount of between about 6 weight percent and about 12 weight percent;
   b. sugar in an amount of between about 18 weight percent and about 37 weight percent, wherein the sugar comprises sucrose and starch hydrolysate having a dextrose equivalent value of between about 18 and about 26 in an amount between about 2 weight percent and about 20 weight percent;
   c. fat in an amount of between about 4 weight percent and about 12 weight percent; and
   d. total solids in an amount of between about 45 weight percent and about 60 weight percent,
wherein the gelato composition has ice crystals sized between about 20 and 50 microns after storage at 10° F. for two weeks.

14. The gelato composition of claim 13, wherein the amount of total solids is between about 48 weight percent and about 55 weight percent.

15. The gelato composition of claim 13, wherein the amount of total solids is between about 49 weight percent and about 51 weight percent.

16. The gelato composition of claim 13, wherein the composition can be stored for up to 1 year at temperatures in a range between about −10° F. and about −20° F. and have ice crystals sized between about 30 and 80 microns.

17. The gelato composition of claim 13, further comprising a gum/stabilizer.

18. The gelato composition of claim 13, wherein nonfat-milk solids are provided by condensed skim milk, heavy cream, half and half, whole milk, buttermilk, dried milk proteins, soy milk, soy protein, milk replacers, or a combination thereof.

19. The gelato composition of claim 13, wherein the amount of nonfat-milk solids is between about 7 weight percent and about 11 weight percent.

20. The gelato composition of claim 13, wherein the amount of nonfat-milk solids is between about 8 weight percent and about 10 weight percent.

21. The gelato composition of claim 13, wherein the total amount of sugar is between about 22 weight percent and 35 weight percent and the starch hydrolysate is between about 6 and about 19 weight percent.

22. The gelato composition of claim 13, wherein the total amount of sugar is between about 27 weight percent and 33 weight percent and the starch hydrolysate is between about 10 and about 18 weight percent.

23. The gelato composition of claim 13, wherein fat is provided by heavy cream, half and half, butterfat, egg yolks, flavoring ingredient, or a combination thereof.

24. The gelato composition of claim 13, wherein the total amount of fat is between about 5 weight percent and about 11 weight percent.

25. The gelato composition of claim 13, wherein the total amount of fat is between about 6 weight percent and about 8 weight percent.

26. The gelato composition of claim 13, wherein the gelato composition includes milk fat in an amount between about 2 weight percent and about 12 weight percent.

27. The gelato composition of claim 13, wherein the gelato composition includes milk fat in an amount between about 3 weight percent and about 9 weight percent.

28. The gelato composition of claim 13, wherein the gelato composition includes milk fat in an amount between about 4 weight percent and about 6 weight percent.

29. The gelato composition of claim 13, wherein the composition contains ice crystals that are sized between about 30 and 80 microns.

30. The gelato composition of claim 13, wherein the composition contains ice crystals that are sized between about 20 microns and 50 microns when stored at about 10° F. for about 2 weeks.

31. The gelato composition of claim 13, wherein the composition has a yield-stress value less than traditional ice cream at −15° C.

32. The gelato composition of claim 13, wherein the composition has a shear-modulus value of less than traditional ice cream at —15° C.

33. The gelato composition of claim 13, wherein a melted gelato composition has a viscosity of between about 2 and 8 poise at $10s^{-1}$ at about 20° C.

34. A gelato composition comprising:
   a. condensed skim milk in a range of between about 16 weight percent and about 30 weight percent;
   b. sucrose in a range of between about 16 weight percent and about 22 weight percent;
   c. heavy cream in a range of between about 11 weight percent and about 14 weight percent;
   d. starch hydrolysate having a DE value of between about 18 and 26 and an amount between about 9 weight percent and about 18 weight percent;
   e. egg yolk in a range of between about 3 weight percent and about 7 weight percent; and
   f. total solids in an amount of between about 45 weight percent and 60 weight percent, wherein the gelato composition has ice crystals sized between about 20 and 50 microns after storage at 10° F. for two weeks.

35. The gelato composition of claim 34, further comprising a flavorant.

36. The gelato composition of claim 35, wherein the flavorant provides chocolate flavor, candy flavor, coffee flavor, nut flavor, fruit flavor, liqueur flavor, or a combination thereof.

37. The gelato composition of claim 36, further comprising lactose-reduced skim milk.

38. The gelato composition of claim 34, further comprising a gum.

39. The gelato composition of claim 38, wherein the gum is pectin.

40. The gelato composition of claim 34, wherein the condensed skim milk is present in a range of between about 25 weight percent and about 28 weight percent.

41. The gelato composition of claim 34, wherein the sucrose is present in a range of between about 18 weight percent and about 20 weight percent.

42. The gelato composition of claim 34, wherein the heavy cream is present in a range of about 12 weight percent to about 13 weight percent.

43. The gelato composition of claim 34, wherein the starch hydrolysate is present in a range of between about 10 weight percent and about 18 weight percent.

44. The gelato composition of claim 34, wherein the egg yolk is present in a range of about 4 weight percent to about 6 weight percent.

45. The gelato composition of claim 34, wherein the amount of total solids is between about 48 weight percent and 55 weight percent.

46. The gelato composition of claim 34, wherein the amount of total solids is between about 49 weight percent and 51 weight percent.

47. The gelato composition of claim 34, wherein the composition contains ice crystals that are sized between about 30 and 80 microns.

48. The gelato composition of claim 34, wherein the composition contains ice crystals that are sized between about 20 microns and 50 microns when stored at about 10° F. for about 2 weeks.

49. The gelato composition of claim 34, wherein the composition has a yield-stress value less than traditional ice cream at −15° C.

50. The gelato composition of claim 34, wherein the composition has a shear-modulus value of less than traditional ice cream at −15° C.

51. The gelato composition of claim 34, wherein a melted gelato composition has a viscosity of between about 2 and 8 poise at $10s^{-1}$ at about 20° C.

* * * * *